May 2, 1933. W. N. BOOTH 1,906,307
VEHICLE WHEEL
Filed Jan. 17, 1929 2 Sheets-Sheet 1
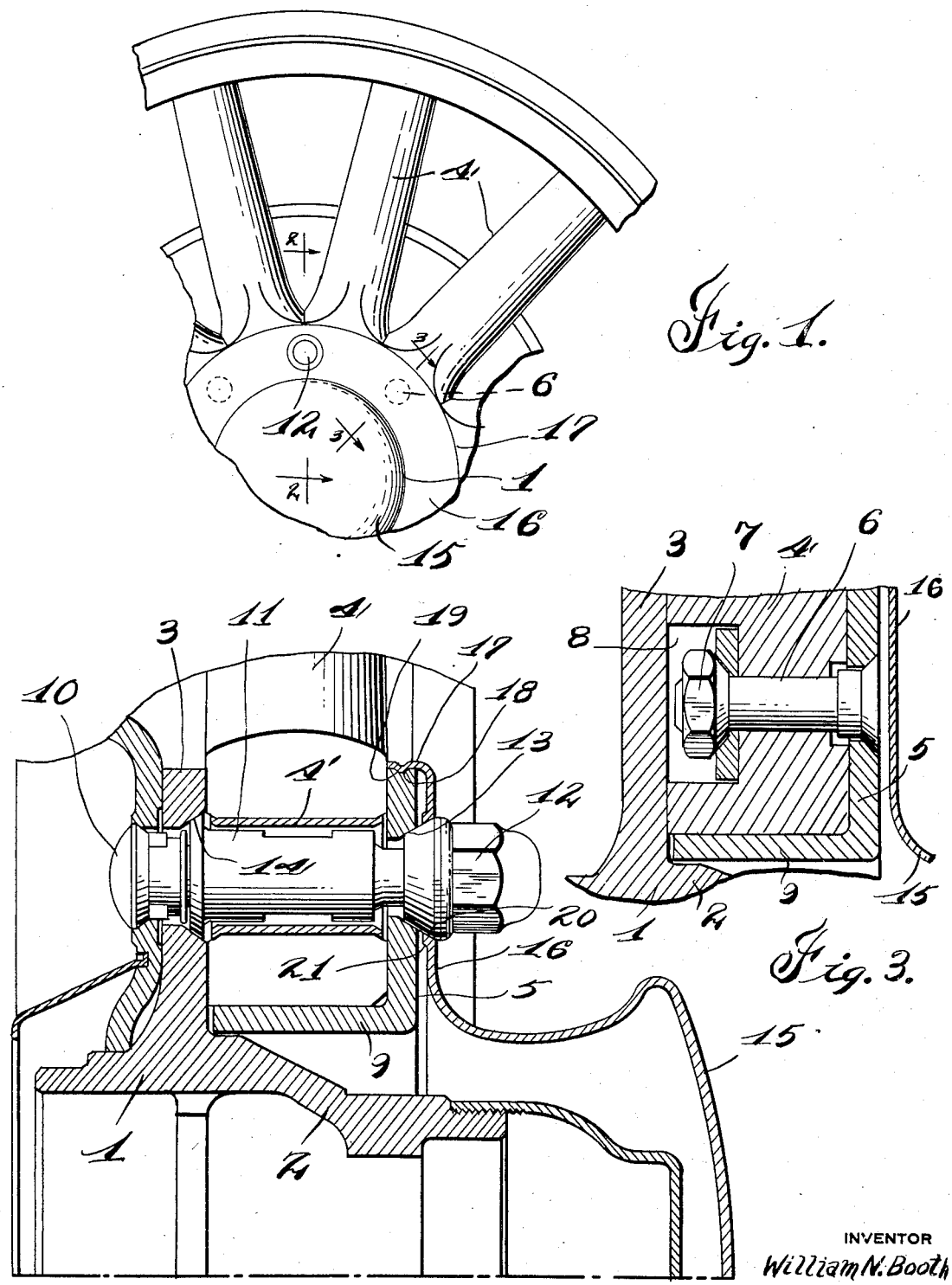
INVENTOR
William N. Booth
BY
Whittemore Hulbert Whittemore Belknap
ATTORNEYS May 2, 1933.  W. N. BOOTH  1,906,307
VEHICLE WHEEL
Filed Jan. 17, 1929   2 Sheets-Sheet 2

Fig. 4.a

INVENTOR
William N. Booth
BY
ATTORNEYS

Patented May 2, 1933                                                              1,906,307

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

VEHICLE WHEEL

Application filed January 17, 1929. Serial No. 333,046.

The invention relates to vehicle wheels and refers more particularly to hub and hub cap assemblies. One of the objects of the invention is to secure a neat and pleasing appearance without increasing the cost of manufacture of the wheel body and hub assembly. Another object is to so construct the wheel that the wheel body and hub cap may be mounted upon or dismounted from the wheel hub as a unit. A further object is to secure the hub cap to the wheel body separately from the means for securing the wheel body to the wheel hub. With these as well as other objects in view, the invention resides in the novel features of construction and combinations and arrangement of parts as more fully hereinafter set forth.

In the drawings:—

Figure 1 is a front elevation of a portion of a wheel embodying my invention;

Figures 2 and 3 are cross sections respectively on the lines 2—2 and 3—3 of Figure 1;

Figure 4a is a detail sectional view of part of the construction shown in Figure 4.

Figure 7:
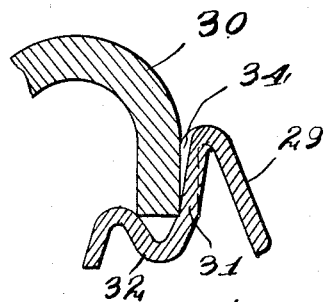
Figure 6:
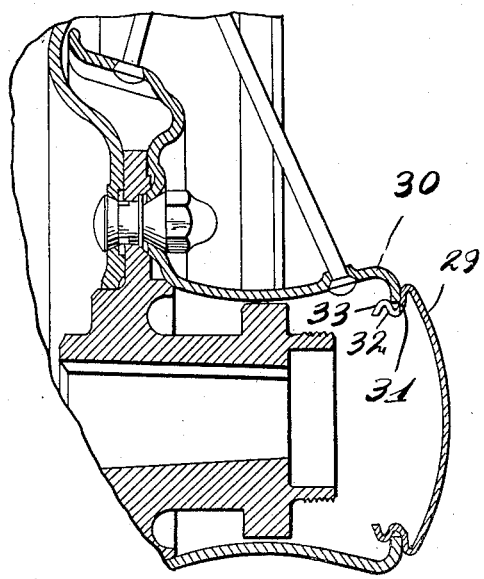
Figure 5:
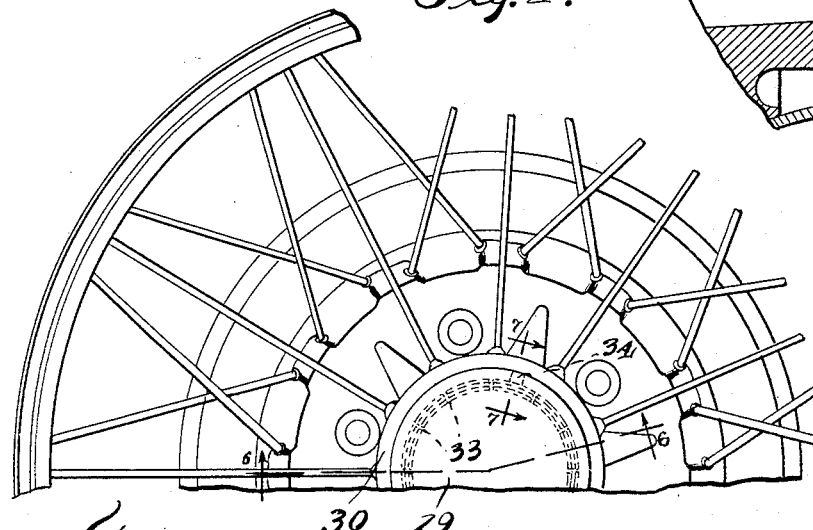
Figure 5 is a view similar to Figure 1, showing another modification.

Figures 6 and 7 are cross sections on the lines 6—6 and 7—7, respectively, of Figure 5.

The vehicle wheel shown in Figures 1, 2 and 3 has the hub 1 which is provided with the barrel 2 and the radial fixed flange 3 at the rear end of the barrel. The wheel body has the wooden spokes 4 which engage the front side of the fixed flange 3. 5 is the clamping flange at the front side of the spokes and permanently secured thereto as by means of the bolts 6 and the nuts 7, the nuts being arranged within the recesses 8 in the rear side of the spokes. This clamping flange preferably has the cylindrical portion 9 located at the inner ends of the spokes.

For detachably securing the wheel body and clamping flange to the wheel hub, I have provided the bolts 10 which are non-rotatably secured to the fixed flange 3 and extend transversely thereof, the bolt extensions 11 threaded upon the bolts 10 and extending through the spokes and clamping flange and the nuts 12 threaded upon the front ends of the bolt extensions and having frusto-conical ends 13 for engaging corresponding recesses in the clamping flange. The portions of the bolt extensions 11 within the spokes are enlarged to have extended bearing engagement with the sleeves 4′ secured in the spokes, whereby an effective drive is secured between the wheel hub and body. Furthermore, these bolt extensions have enlarged frusto-conical inner ends 14 for engaging correspondingly shaped recesses in the front side of the fixed flange 3 to form extended bearings for holding the bolts from rocking relative to the fixed flange.

For securing a neat and pleasing appearance, I have provided the hub cap 15 which is preferably formed of sheet metal and drawn to shape and has the flange portion 16 which terminates in the transverse cylindrical flange 17. This cylindrical flange is provided with the peripherally spaced inwardly extending bosses 18 adapted to fit into the annular groove 19 in the periphery of the securing flange 5, the flange 17 being resilient to permit the bosses to snap into the groove. The flange portion 16 is also provided with the apertures 20 for the passage of the nuts 12 and these apertures are surrounded by tapered flanges 21 of a size to engage the frusto-conical ends 13 of the nuts, which latter upon being tightened down engage the tapered flanges and slightly flex the radial flange portion and thereby assure holding the hub cap from disengagement.

With this ararngement and upon removal of the nuts 12, the wheel body 4, the clamping flange 5 and the hub cap 15 may be removed as a unit from the wheel hub and replaced thereon as a unit. Also upon removal of the nuts 12, the hub cap 15 may be removed from the clamping flange 5 by forcing the bosses 18 out of the groove 19.

Figure 4:
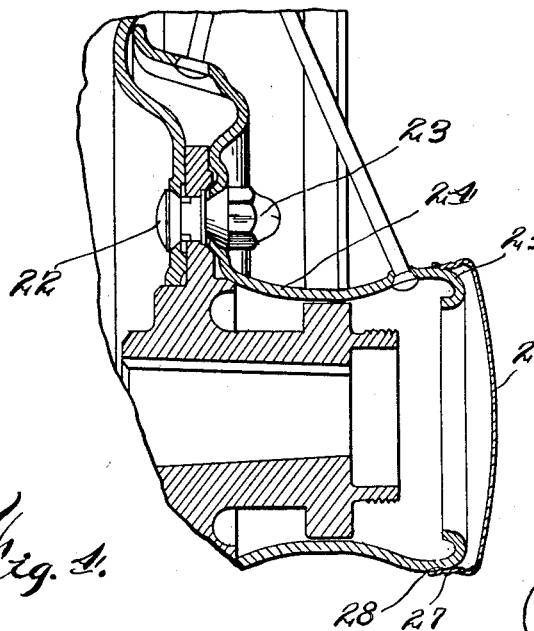
Figure 4 is a view similar to Figure 2, showing a modification.

Figure 4 shows a modification having a wire wheel body which is demountably secured to the hub as by means of the bolts 22 and the nuts 23. 24 is the hub shell of this wire wheel body having at its front end the annular peripheral groove 25. 26 is the hub cap, which is preferably formed of sheet metal and drawn to shape and has the transverse cylindrical flange 27 which is provided with the peripherally spaced inwardly extending bosses 28 adapted to snap into the groove 25, the flange 27 being resilient.

In the modification shown in Figures 5, 6 and 7, the hub cap 29, which is preferably formed of sheet metal and drawn to shape, differs from the hub cap 26 in that it extends within the hub shell 30. In detail, this hub cap 29 has the annular radial inwardly extending flange 31 adapted to abut the front end of the hub shell 30 and terminating in the axially extending flange 32 extending within the front end of the hub shell. This axially extending flange might be said to be S-shaped in cross section, it being bent to form an outwardly opening annular groove and an inwardly opening annular groove with the latter located in rear of the former and the former being adapted to engage the edge of the hub shell. This axially extending flange is formed with the peripherally spaced slots 33 providing for its flexing to enable it to snap into the hub shell. To facilitate removing the hub cap from the hub shell, the annular radially extending flange 31 is forwardly offset at 34 to provide a space between this flange and the hub shell for the insertion of a suitable tool, such as a screw driver, for prying the hub cap from the hub shell.

What I claim as my invention is:

1. A vehicle wheel having in combination a hub, a wheel body, a flange at the front side of said wheel body and permanently secured thereto, means for detachably securing said wheel body and flange to said hub, and a hub cap having a snap engagement with the periphery of said flange.

2. A vehicle wheel having in combination a hub provided with a fixed flange, a wheel body at the front side of said flange, a flange at the front side of said wheel body, means for securing said wheel body and last mentioned flange to said fixed flange, said means including nuts engaging the front side of said last mentioned flange, and a hub cap concealing said last mentioned flange and secured to the periphery thereof independently of said securing means and also engaged by said nuts.

3. A vehicle wheel having in combination a hub provided with a fixed flange at its inner end, a wheel body at the front side of said fixed flange, a flange at the front side of said wheel body, means for permanently securing said wheel body and last mentioned flange to each other, means for securing said wheel body and last mentioned flange to said fixed flange, including bolts secured to said fixed flange, bolt extensions upon said bolts engaging in apertures in said wheel body and adapted to drive said wheel body with said hub, and nuts threaded upon the front ends of said bolts and engaging said last mentioned flange, and a hub cap completely concealing said last mentioned flange and having a snap engagement with the periphery thereof, said hub cap being apertured for the passage of said nuts.

4. A vehicle wheel having in combination, a hub, a wheel body member mounted upon the hub, a radial flange at the front side of the wheel body member, means permanently securing the radial flange to the wheel body member, means for detachably securing the flange and wheel body member to the hub including bolts extending forwardly from the hub through the wheel body and flange and nuts threadedly mounted upon the outer ends of said bolts and engaging the radial flange, a hub cap having a portion concealing the radial flange and apertured to receive the outer ends of said bolts and adapted to be engaged by said nuts and an annular flange projecting rearwardly from the portion of the cap aforesaid encircling said radial flange and detachably secured thereto.

5. In a vehicle wheel, the combination with a hub having a radially extending fixed flange, a wheel body at the front side of the fixed flange, a flange at the front side of the wheel body, bolts extending forwardly from said fixed flange through openings in said wheel body and front flange, nuts threaded upon the outer ends of the bolts and engageable with said front flange for detachably securing the same and wheel body to the fixed flange aforesaid, a hub cap having a barrel provided with a radially extending portion at the rear end thereof concealing the front flange, and a flange extending rearwardly from the portion aforesaid of the cap encircling the periphery of the front flange and having an inwardly extending annular bead adapted to engage a shoulder on said front flange for detachably securing the cap to the latter.

6. A vehicle wheel having in combination, a hub, a wheel body member secured to the hub, a flange at the front side of the wheel body member, means detachably securing the wheel body member and flange to the hub, a cap having a portion concealing the hub and flange and secured to said hub by the means aforesaid, and an annular flange extending rearwardly from the portion aforesaid of the cap and having a snap engagement with the periphery of said flange.

7. A vehicle wheel having in combination, a hub, a wheel body member secured to the hub, a flange at the front side of the wheel body member, means detachably securing the wheel body member and flange to the hub, and a hub cap having a portion secured to the hub by the means aforesaid and having an annular portion spaced radially beyond the portion aforesaid and fashioned for attachment to the periphery of the flange.

8. A vehicle wheel having in combination, a hub, a wheel body having an annular portion extending axially forwardly from the front side thereof, means spaced radially inwardly from the portion aforesaid of the wheel body for detachably securing the latter to the hub, and a hub cap having a portion secured to the hub by the means aforesaid and having an annular rearwardly extending portion detachably secured to the periphery of the portion aforesaid of the wheel body in overlapping relation therewith.

9. A vehicle wheel having in combination, a hub, a wheel body carried by the hub having a plurality of spokes, a member for retaining the spokes in assembled relation and having a radially extending flange embracing the front side of the spokes, means detachably securing the wheel body and flange to the hub, and means for concealing the hub and flange comprising a cap having a portion fashioned to snap into engagement with the periphery of said flange.

In testimony whereof I affix my signature.

WILLIAM N. BOOTH.